United States Patent
Jufuku et al.

(10) Patent No.: US 8,361,675 B2
(45) Date of Patent: Jan. 29, 2013

(54) MOVING BODY EQUIPPED WITH FUEL CELLS

(75) Inventors: Yasunobu Jufuku, Mishima (JP); Hiroshi Arisawa, Susono (JP); Junji Nagasawa, Numazu (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 684 days.

(21) Appl. No.: 12/445,770

(22) PCT Filed: Dec. 3, 2007

(86) PCT No.: PCT/JP2007/073733
§ 371 (c)(1),
(2), (4) Date: Apr. 16, 2009

(87) PCT Pub. No.: WO2008/069331
PCT Pub. Date: Jun. 12, 2008

(65) Prior Publication Data
US 2010/0297514 A1    Nov. 25, 2010

(30) Foreign Application Priority Data
Dec. 5, 2006    (JP) .................. 2006-327843

(51) Int. Cl.
*H01M 8/04* (2006.01)
*H01M 2/12* (2006.01)
*H01M 2/38* (2006.01)
*H01M 2/04* (2006.01)
*B60K 1/00* (2006.01)

(52) U.S. Cl. .......... 429/512; 429/71; 429/456; 429/459; 180/65.1

(58) Field of Classification Search ............... 429/512, 429/71, 65.21, 456, 459; 180/65.1
See application file for complete search history.

(56) References Cited

U.S. PATENT DOCUMENTS
(Continued)

FOREIGN PATENT DOCUMENTS
CA    2274240    3/2000
CN    2343351 Y    10/1999
(Continued)

OTHER PUBLICATIONS

Office Action issued Jan. 31, 2012, in Chinese Patent Application No. 200780044631.1 (with English language translation).

*Primary Examiner* — Patrick Ryan
*Assistant Examiner* — Julian Anthony
(74) *Attorney, Agent, or Firm* — Oblon, Spivak, McClelland, Maier & Neustadt, L.L.P.

(57) ABSTRACT

A vehicle 1000 has two pipings 60 and 62 arranged to discharge an exhaust gas from a fuel cell stack 10 to the outside of the vehicle 1000. An outlet provided at an end of the piping 60 is located at an underfloor position in a rear portion of the vehicle 1000, while an outlet provided at an end of the piping 62 is located at a roof rear end of the vehicle 1000. When the outlet provided at the end of the piping 60 is blocked or when there is a potential for such blockage, the outlet provided at the end of the piping 62 is used to discharge the exhaust gas from the fuel cell stack 10 to the outside of the vehicle 1000. This arrangement ensures continuous drive of the vehicle 1000 even in a specific environment where any of various obstructing objects as the cause of blockage of the outlet is present in the surroundings of the vehicle 1000.

13 Claims, 6 Drawing Sheets

U.S. PATENT DOCUMENTS

| | | | |
|---|---|---|---|
| 5,641,031 A * | 6/1997 | Riemer et al. | 429/423 |
| 6,378,637 B1 | 4/2002 | Ono et al. | |
| 7,147,953 B2 * | 12/2006 | Haltiner et al. | 429/459 |
| 2003/0235740 A1 * | 12/2003 | Haltiner et al. | 429/34 |
| 2007/0007194 A1 | 1/2007 | Yoshida et al. | |

FOREIGN PATENT DOCUMENTS

| | | |
|---|---|---|
| JP | 4 13411 | 2/1992 |
| JP | 5 125936 | 5/1993 |
| JP | 9 156382 | 6/1997 |
| JP | 2001 71753 | 3/2001 |
| JP | 2001 113960 | 4/2001 |
| JP | 2002 289237 | 10/2002 |
| JP | 2003 219512 | 7/2003 |
| JP | 2004 136828 | 5/2004 |
| JP | 2004 341795 | 12/2004 |
| JP | 2005 153852 | 6/2005 |
| JP | 2005 306230 | 11/2005 |
| JP | 2006 313664 | 11/2006 |

* cited by examiner

ND WITH FUEL
MOVING BODY EQUIPPED WITH FUEL CELLS

TECHNICAL FIELD

The present invention relates to a moving body equipped with fuel cells. More specifically the invention pertains to a technique of discharging an exhaust fluid from the fuel cells to outside of the moving body.

BACKGROUND ART

In a vehicle equipped with fuel cells, a motor is driven with electric power generated by the fuel cells, and the driving power of the motor is used to rotate an axle with wheels and drive the vehicle. One proposed structure of such a vehicle has exhaust piping with an outlet to discharge the exhaust gas from the fuel cells to the outside of the vehicle. This outlet is generally located at an underfloor position in a rear portion of the vehicle main body, like the conventional vehicle driven with the output power of an internal combustion engine (see, for example, Japanese Patent Laid-Open No. 2002-289237). This arrangement of the outlet enables the exhaust gas from the fuel cells and water produced by power generation or by electrochemical reaction of hydrogen with oxygen (hereafter the exhaust gas and the produced water may collectively be referred to as 'exhaust fluid') to be discharged directly onto the road surface. One known gas discharge structure for vehicle-installed fuel cells is disclosed in, for example, Japanese Patent Laid-Open No. 2003-219512.

In the prior art structure disclosed in Japanese Patent Laid-Open No. 2002-289237, however, during drive of the vehicle equipped with the fuel cells on the water-covered road, the outlet may be blocked by the water, soil, sand, and other equivalent substances present on the road surface. Such blockage of the outlet may interfere with the smooth discharge of the exhaust gas and the produced water and stop power generation by the fuel cells to eventually prevent further run of the vehicle. The water, soil, sand, and other equivalent substances flowed into the outlet may run through the piping to reach the inside of the fuel cells and cause malfunction of the fuel cells.

This problem is not characteristic of the vehicle equipped with fuel cells but is commonly found in various moving bodies equipped with fuel cells and configured to be driven on the road surface with electric power generated by the fuel cells as the driving power source. Typical examples of such moving bodies include air craft and boats and ships, in addition to the vehicles.

DISCLOSURE OF THE INVENTION

In order to solve the problems of the prior art discussed above, there would be a demand for providing a technique adopted to a moving body equipped with fuel cells to ensure continuous drive of the moving body in a specific environment where any of various obstructing objects as the cause of blockage of an outlet for discharging an exhaust fluid from the fuel cells to the outside of the moving body is present in the surroundings of the moving body.

The present invention accomplishes at least part of the demand mentioned above and the other relevant demands by the following configurations applied to the moving body. According to one aspect, the invention is directed to a moving body equipped with fuel cells. The moving body has exhaust piping arranged to flow out an exhaust fluid discharged from the fuel cells. The exhaust piping has multiple outlets to discharge the exhaust fluid out of the moving body. At least two of the multiple outlets are located at positions of different heights.

In the moving body according to this aspect of the invention, the exhaust piping has the multiple outlets formed to discharge the exhaust fluid from the fuel cells to the outside of the moving body. At least two outlets among the multiple outlets are located at the positions of mutually different heights. The arrangement of the multiple outlets at the different heights effectively lowers the potential of simultaneous blockage of the multiple outlets by the various obstructing objects mentioned above, compared with the arrangement of multiple outlets at an identical height. For example, even when one outlet located at a relatively low position, for example, at an underfloor position in a rear portion of the main body of the moving body, is blocked by the water, soil, sand, and other equivalent substances on the road surface during drive of the moving body on the water-covered road, this arrangement ensures continuous power generation by the fuel cells with discharging the exhaust fluid to the outside of the moving body via an unblocked outlet located at a relatively high position. In another example, even when one outlet located at the relatively high position is blocked by some obstructing object, such as a falling object from the sky or a flying object, during drive of the moving body on the ordinary road surface, this arrangement ensures continuous power generation by the fuel cells with discharging the exhaust fluid to the outside of the moving body via an unblocked outlet located at the relatively low position. This arrangement of the invention accordingly enables the moving body equipped with the fuel cells to be continuously driven even in the specific circumstance where any of the various obstructing objects as the cause of blockage of the outlet is present in the surroundings of the moving body.

In the moving body of the invention discussed above, various configurations are applicable to the exhaust piping. In one preferable application of the moving body according to the above aspect of the invention, the exhaust piping has first piping with a first outlet provided on an end thereof and second piping with a second outlet provided on an end thereof, and the second outlet is located at a higher position than a position of the first outlet in a vertical direction. For example, even when the first outlet located at the relatively low position is blocked by the water, soil, sand, and other equivalent substances on the road surface during drive of the moving body on the water-covered road, this arrangement ensures continuous power generation by the fuel cells with discharging the exhaust fluid to the outside of the moving body via the unblocked second outlet located at the relatively high position.

As mentioned previously, the exhaust fluid includes the produced water, as well as the exhaust gas. The arrangement of discharging the exhaust fluid via the first outlet located at the relatively low position has the higher discharge efficiency of the exhaust fluid, compared with the arrangement of discharging the exhaust fluid via the second outlet. In the moving body of this application, the first outlet may be used as a main exhaust hole of discharging the exhaust fluid from the fuel cells to the outside of the moving body, while the second outlet may be used as an auxiliary exhaust hole.

In the structure of the moving body of this application, the first piping and the second piping may be provided independently or the second piping may be connected with and branched off from the first piping. In one embodiment of the moving body of this application, the first piping has a higher place element formed to cause the exhaust fluid flowing through the first piping to be flowed at a higher position than the position of the first outlet, as part of the first piping. The second piping is connected with and branched off from the higher place element of the first piping or from an upstream part of the first piping in upstream of the higher place element in a flow direction of the exhaust fluid. During drive of the moving body of the invention on the water-covered road, even when the level of the water present on the road surface becomes higher than the height of the first outlet, this arrangement effectively prevents the inflow of the water, soil, sand, and other equivalent substances from the first outlet into the inside of the fuel cells until the level of the water present on the road surface reaches or exceeds the height of the higher place element. In this state, this arrangement enables the exhaust fluid to be discharged through the second piping and the second outlet.

In the moving body with the exhaust piping including the first piping and the second piping, the second piping may be set to have an inner diameter that is smaller than an inner diameter of the first piping. This arrangement desirably facilitates the layout of the second piping in the moving body and saves the space required for the installation of the second piping, thus effectively preventing size expansion of the moving body by the installation of the second piping.

In one preferable embodiment of the invention, the moving body equipped with the second piping connected with and branched off from the first piping further has a changeover unit provided at a connection of the first piping with the second piping to change over flow of the exhaust fluid between a flow route of being discharged via the first outlet and a flow route of being flowed through the second piping and discharged via the second outlet. During drive of the moving body of this embodiment on the water-covered road surface, when the first outlet is blocked by some obstructing object or when there is a potential for such blockage, the changeover unit functions to make the exhaust fluid flowed from the first piping to the second piping and discharge the exhaust fluid from the second outlet.

In the moving body of the above embodiment, the changeover unit includes a pressure control mechanism configured to make the exhaust fluid flow through the second piping when an internal pressure of the first piping increases to or above a preset reference value. The reference value relating to the internal pressure of the first piping is set to a criterion value that may suggest blockage of the first outlet during power generation by the fuel cells. In the event of blockage of the first outlet, the changeover unit is automatically switched over to discharge the exhaust fluid via the second outlet without an external instruction for controlling the changeover unit. The pressure control mechanism is, for example, a relief valve or an orifice.

In another preferable embodiment of the invention, the moving body equipped with the changeover unit further has: a detector configured to detect a presence status of an obstructing object, which has a potential for blocking the first outlet, in the surroundings of the moving body; a changeover valve provided as the changeover unit to change over the flow of the exhaust fluid between the flow route of being discharged via the first outlet and the flow route of being flowed through the second piping and discharged via the second outlet; and a valve controller configured to control operation of the changeover valve according to the presence status of the obstructing object detected by the detector. In the moving body of this embodiment, the operation of the changeover valve is controlled according to the presence status of the obstructing object in the surroundings of the moving body to switch over the flow of the exhaust fluid between the flow route of being discharged via the first outlet and the flow route of being flowed through the second piping and discharged via the second outlet. One typical example of the detector is a water level sensor as described later. The detector may make communication with some information center to receive flood information and estimate the presence status of the obstructing object on the road surface based on the received flood information. The detector may take an image of the status of the road surface during drive of the vehicle with a camera, analyze the taken image by image processing, and estimate the presence status of the obstructing object on the road surface according to the result of the analysis.

In one preferable application of the moving body of the above embodiment, the obstructing object is water present on the surface, and the detector includes a water level sensor configured to detect a level of the water present on the road surface. During drive of the moving body of this application on the water-covered road, the operation of the changeover valve is controlled according to the level of the water present on the road surface, on which the moving body is driven, to switch over the flow of the exhaust fluid between the flow route of being discharged via the first outlet and the flow route of being flowed through the second piping and discharged via the second outlet. Diverse sensors, for example, a float switch, a ultrasonic sensor, and a capacitance sensor, may be adopted for the water level sensor.

It is preferable that the moving body of the above application further has a damping member configured to attenuate a rippling phenomenon on a water surface as a detection object of the water level by the water level sensor. This arrangement ensures the accurate detection of the level of the water present on the road surface, on which the moving body is driven.

In the moving body with the water level sensor as the detector, the valve controller controls operation of the changeover valve to make the exhaust fluid flow through the second piping when the water level detected by the water level sensor is not lower than a preset reference height. The reference height relating to the water level is set to a criterion value that may suggest the inflow of the water, soil, sand, and other equivalent substances into the first outlet or the potential for such inflow during power generation by the fuel cells. During drive of the moving body of this application on the water-covered road, even in a specific circumstance where the water, soil, sand, and other equivalent substances flow into the first outlet or there is a potential for such inflow, the operation of the changeover valve is controlled to prevent the further inflow of the water, soil, sand, and other equivalent substances from the first outlet into the inside of the fuel cells, thus protecting the fuel cells from a potential damage.

In the moving body having any of the arrangements discussed above, it is preferable that the fuel cells are located in an underfloor area of the moving body. One typical example of the moving body is a vehicle. In this example, this arrangement ensures the effective use of the underfloor space of the vehicle. The installation of the fuel cells in the underfloor area of the vehicle lowers the center of gravity of the vehicle and improves the driving stability of the vehicle. The vehicle equipped with the fuel cells generally has a cooling device (radiator) for cooling down the flow of cooling water, which is circulated to cool down the fuel cells. The radiator is provided in a front portion of the vehicle to utilize the driving wind of the vehicle for cooling down the flow of cooling water. The arrangement of the fuel cells installed in the underfloor area of the vehicle desirably leaves a wider space surrounding the radiator, compared with the arrangement of the fuel cells installed near to the radiator. This arrangement effectively enhances the heat release rate of the radiator and improves the air cooling efficiency of the cooling water.

The present invention is not restricted to the moving body having any of the arrangements discussed above, but is also actualized by a control method of such a moving body. There are diversity of other applications, for example, a computer program of actualizing the functions of the moving body or the control method of the moving body, a recording medium in which such a computer program is recorded, and a data signal constructed to include such a computer program and embodied in a carrier wave. Any of various additional arrangements discussed above may be adopted in any of these diverse applications.

In the application of the invention as the computer program or as the recording medium in which the computer program is recorded, the invention may be constructed as the whole program of controlling the operation of the moving body or as only characteristic part of the program actualizing the functions of the invention. The recording medium may be any of various computer-readable media, such as flexible disks, CD-ROMs, DVD-ROMs, magneto-optical disks, IC cards, ROM cartridges, punched cards, prints with barcodes or other codes printed thereon, and internal storage devices (memories like RAM and ROM) and external storage devices of the computer.

BEST MODES OF CARRYING OUT THE INVENTION

Some modes of carrying out the invention are discussed below as preferred embodiments.

A. First Embodiment

A1. Configuration of Fuel Cell System Mounted on Vehicle

Figure 1:
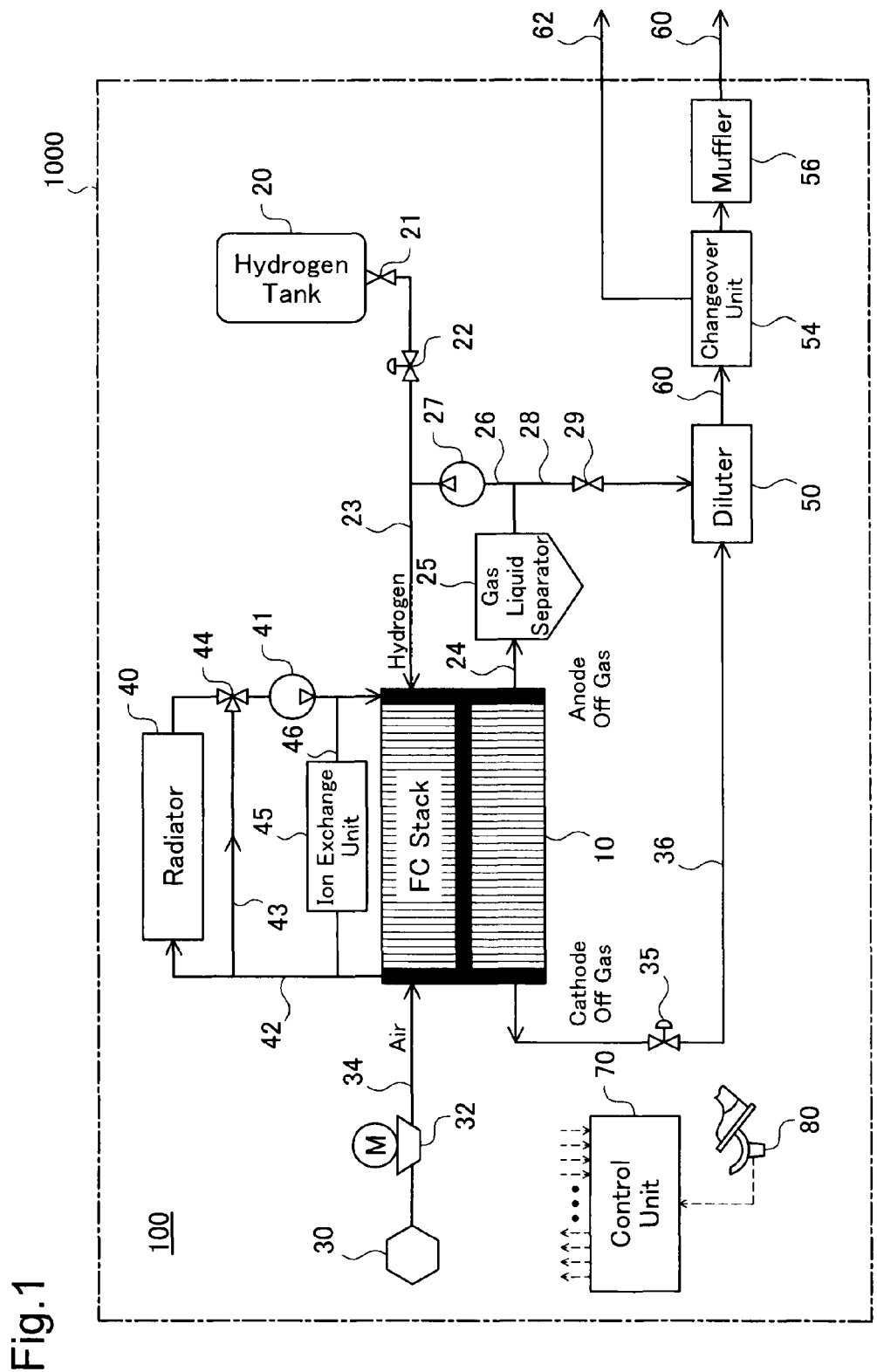
FIG. 1 schematically illustrates the configuration of a fuel cell system 100 mounted on a vehicle 1000 in one embodiment of the invention.

FIG. 1 schematically illustrates the configuration of a fuel cell system 100 mounted on a vehicle 1000 in one embodiment of the invention. The vehicle 1000 is an electric vehicle driven with rotation of an axle and wheels by the power of a motor, which is operated with electric power generated by the fuel cell system 100. In response to the driver's operation of an accelerator placed in the vehicle 1000, the fuel cell system 100 generates electric power according to the driver's accelerator operation amount detected by an accelerator opening sensor 80. The vehicle 1000 of the embodiment corresponds to the moving body of the invention.

A fuel cell (FC) stack 10 is constructed as a laminate of multiple cells designed to generate electric power through electrochemical reaction of hydrogen with oxygen. Each cell has a hydrogen electrode (hereafter referred to as anode) and an oxygen electrode (hereafter referred to as cathode) arranged across a proton-conductive electrolyte membrane (not shown). In the structure of this embodiment, each of the cells is a solid polymer fuel cell having a solid polymer electrolyte membrane of, for example, Nafion (registered trademark). This is, however, neither essential nor restrictive, and various types of fuel cells may be adopted for the cells of the embodiment.

A supply of hydrogen as a fuel gas is fed from a hydrogen tank 20 storing high-pressure hydrogen via piping 23 to the anodes of the fuel cell stack 10. The hydrogen tank 20 may be replaced by a hydrogen generator constructed to generate hydrogen by reforming reaction of an alcohol, a hydrocarbon, or an aldehyde as the starting material.

The high-pressure hydrogen stored in the hydrogen tank 20 is subjected to regulation of the pressure and the supply amount by a shut valve 21 and a regulator 22 provided at an outlet of the hydrogen tank 20 and is supplied to the anodes of the fuel cell stack 10. The exhaust gas from the anodes (hereafter referred to as anode off gas) is flowed through a pipe 24 and is introduced into a gas liquid separator 25. The gas liquid separator 25 separates the water content included in the anode off gas from remaining hydrogen unconsumed by the power generation in the fuel cell stack 10. The hydrogen separated by the gas liquid separator 25 goes through circulation piping 26 and is recirculated to the piping 23. A pipe 28 is connected with and branched off from the circulation piping 26 at a position between the gas liquid separator 25 and a circulation pump 27. The pipe 28 is provided with a purge valve 29. In a closed position of the purge valve 29, the anode off gas or more specifically the hydrogen separated from the anode off gas by the gas liquid separator 25 is flowed through the circulation piping 26 and is recirculated to the fuel cell stack 10. This arrangement ensures the effective use of hydrogen. The pressure of the anode off gas is decreased to a relatively low level as the result of consumption of hydrogen by the power generation in the fuel cell stack 10. The circulation pump 27 is accordingly provided to apply pressure to the anode off gas in the course of recirculation.

In the course of recirculation of the anode off gas, while hydrogen is consumed by the power generation, impurities of the anode off gas other than hydrogen, for example, nitrogen transmitted from the cathodes to the anodes across the electrolyte membranes, are not consumed but remain in the anode off gas. This gradually increases the concentration of the impurities in the anode off gas. In response to an open operation of the purge valve 29 in this state, the anode off gas is introduced through a pipe 28 into a diluter 50 to be diluted with cathode off gas and is discharged out of the fuel cell system 100 as discussed below. This decreases the concentration of the impurities included in the anode off gas. Since the remaining hydrogen is simultaneously discharged with the impurities, it is desirable to minimize the valve-opening frequency of the purge valve 29 for the improved fuel consumption.

A supply of the compressed air is fed as an oxygen-containing oxidizing gas to the cathodes of the fuel cell stack 10. The air is taken in by an air cleaner 30, is compressed by an air compressor 32, and is supplied through a pipe 34 to the cathodes of the fuel cell stack 10. A humidifier may be provided on the pipe 34 to humidify the air to be supplied to the fuel cell stack 10 and keep the electrolyte membranes of the fuel cell stack 10 moist. The exhaust gas from the cathodes (hereafter referred to as cathode off gas) is flowed out to a pipe 36. The pipe 36 is provided with an air pressure regulator 35. The pressure of the air in the fuel cell stack 10 is controllable by regulation of the air pressure regulator 35.

The cathode off gas flowed out to the pipe 36 and the anode off gas flowed out to the pipe 28 in the open position of the purge valve 29 are introduced into the diluter 50. The diluter 50 mixes the anode off gas with the cathode off gas to dilute the concentration of hydrogen included in the anode off gas. The exhaust gas from the diluter 50 is flowed through piping 60 and a muffler 56 and is discharged via an outlet at an end of the piping 60 to the outside of the vehicle 1000.

In the structure of this embodiment, a changeover unit 54 is provided between the diluter 50 and the muffler 56. In a certain environment that is unsuitable for or is incapable of discharging the exhaust gas from the outlet at the end of the piping 60 to the outside of the vehicle 1000, the changeover unit 54 is used to discharge the exhaust gas via an outlet at an end of piping 62 connecting with the piping 60 to the outside of the vehicle 1000. The details of the changeover unit 54 will be described later.

The fuel cell stack 10 generates heat through the electrochemical reaction and accordingly receives a supply of cooling water. The cooling water is flowed through a conduit 42 for cooling water by means of a circulation pump 41, is cooled down by a radiator 40, and is supplied to the fuel cell stack 10. The conduit 42 has a bypass pipe 43 for circulation of cooling water detouring the radiator 40 as illustrated. A three-way valve 44 is provided at one connection of the conduit 42 with the bypass pipe 43. A switchover of the three-way valve 44 causes the flow of cooling water to detour the radiator 40 and to be circulated through the conduit 42 and the bypass pipe 43. An ion exchange unit 45 is connected via a pipe 46 to the conduit 42 as illustrated. The ion exchange unit 45 works to remove various ions that are included in the cooling water and are expected to increase the electric conductivity of the fuel cell stack 10.

The operation of the fuel cell system 100 is controlled by a control unit 70. The control unit 70 is constructed as a microcomputer including a CPU, a RAM, and a ROM and controls the operations of the system including various valves and pumps according to a program stored in the ROM. The control unit 70 of the embodiment is equivalent to the valve controller of the invention.

Although not being specifically illustrated, in the structure of the embodiment, the fuel cell stack 10 is kept in a fuel stack casing and is located in an underfloor area of the vehicle 1000. The diluter 50, the gas liquid separator 25, the changeover unit 54, the muffler 56, and the piping for the mutual connections are also located in the underfloor area of the vehicle 1000. The hydrogen tank 20 is placed under the rear seat in the vehicle 1000. This arrangement ensures the effective use of the underfloor space of the vehicle 1000. Providing the fuel cell stack 10 in the underfloor area of the vehicle 1000 desirably lowers the center of gravity of the vehicle 1000 and improves the stability of vehicle driving.

The radiator 40, the circulation pump 41, the ion exchange unit 45, and the control unit 70 are located in a front space of the vehicle 1000. Compared with the layout of locating the fuel cell stack 10 near to the radiator 40, this layout desirably ensures the wide vacant space surrounding the radiator 40. This arrangement effectively increases the heat release efficiency of the radiator 40 and thereby improves the air cooling efficiency of cooling water.

A2. Structure of Changeover Unit

Figure 2:
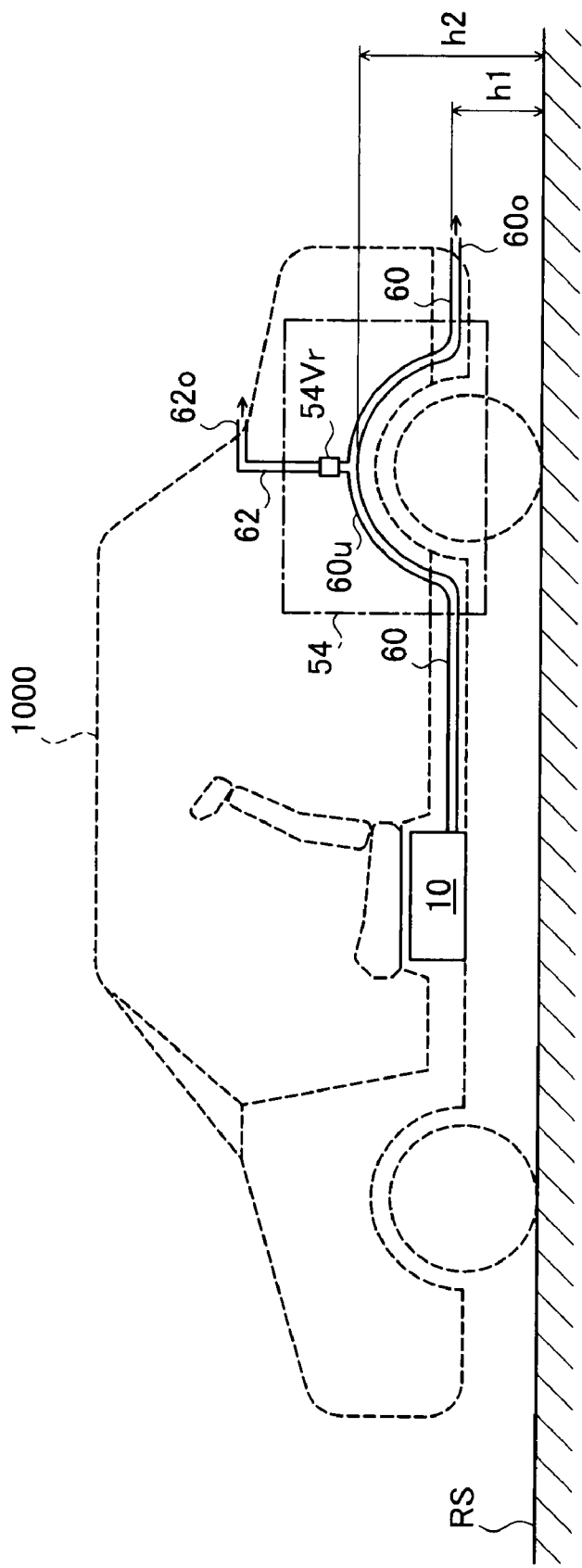
FIG. 2 shows the schematic structure of a changeover unit 54 of a first embodiment.

FIG. 2 shows the schematic structure of the changeover unit 54 of a first embodiment. For the simplicity of illustration, only part of the fuel cell system 100 (see FIG. 1) mounted on the vehicle 1000 is shown in FIG. 2. As illustrated, the piping 60 of the embodiment includes a U tube 60$u$ convex upward in a vertical direction as part of the piping 60 and has an outlet 60$o$ on its end. The outlet 60$o$ is located at an underfloor position in a rear portion of the vehicle 1000. The piping 60 and the U tube 60$u$ of the embodiment correspond to the first piping of the invention. The U tube 60$u$ and the outlet 60$o$ are respectively equivalent to the higher place element and the first outlet of the invention.

Piping 62 is connected with and branched off from the top of the U tube 60$u$. The piping 62 is extended along the inner side face of the body of the vehicle 1000 to above a trunk room and has an outlet 62$o$ on its end. Namely the outlet 62$o$ is located at a higher position than the outlet 60$o$. The piping 62 corresponds to the second piping of the invention. The outlet 62$o$ is equivalent to the second outlet of the invention.

The piping 62 is provided with a relief valve 54Vr, which is kept closed in the ordinary state, that is, under the condition of a relatively low internal pressure of the U tube 60$u$ and is automatically opened with an increase of the internal pressure of the U tube 60$u$ to or above a preset reference value. The reference value relating to the internal pressure of the U tube 60$u$ is set to a criterion value that may suggest blockage of the outlet 60$o$ during power generation by the fuel cell stack 10. The relief valve 54Vr corresponds to the pressure control mechanism of the invention.

In the structure of the embodiment, the inner diameter of the piping 62 is set to be sufficiently smaller than the inner diameter of the piping 60, although not being specifically illustrated. This arrangement facilitates the layout of the piping 62 in the vehicle 1000 and saves the space required for the installation of the piping 62, thus effectively preventing size expansion of the vehicle 1000 by the installation of the piping 62 and space reduction of the passenger compartment.

When the vehicle 1000 equipped with the changeover unit 54 runs on the water-covered road with the water on the road surface RS having the water level of lower than a height h1 between the road surface RS and the top of the outlet 60$o$ or runs on the ordinary dry road surface RS, the internal pressure of the U tube 60$u$ is relatively low. The relief valve 54Vr is accordingly closed, so that the exhaust gas from the fuel cell stack 10 is discharged via the outlet 60$o$ to the outside of the vehicle 1000.

When the vehicle 1000 runs on the water-covered road with the water on the road surface RS having the water level of not lower than the height h1 between the road surface RS and the top of the outlet 60$o$, the outlet 60$o$ is blocked by the water, soil, sand, and other equivalent substances. Such blockage increases the internal pressure of the U tube 60$u$ and automatically opens the relief valve 54Vr. The exhaust gas from the fuel cell stack 10 accordingly runs through the piping 62 and is discharged via the outlet 62$o$ at the end of the piping 62 to the outside of the vehicle 1000. This arrangement effectively prevents the water, soil, sand, and other equivalent substances from being flowed into the upstream of the U tube 60$u$ until the level of the water on the road surface RS exceeds a height h2 between the road surface RS and the top of the U tube 60$u$.

When the vehicle 1000 has passed through the water-covered road and the water, soil, sand, and other equivalent substances blocking the outlet 60$o$ are removed, for example, by the back pressure of the exhaust gas, the internal pressure of the U tube 60u is lowered. The relief valve 54Vr is then automatically closed.

A3. Comparative Example and Effects of First Embodiment

The prior art technique disclosed in Japanese Patent Laid-Open No. 2003-219512 cited above is given as a comparative example of the first embodiment. Japanese Patent Laid-Open No. 2003-219512 describes the arrangement of an outlet (gas release hole) in a rectifier structure (air spoiler) located on a rear end of a vehicle body equipped with fuel cells. In this structure, the outlet is located at the higher position than the underfloor position of the vehicle body. Even when the vehicle runs on the water-covered road with the water on the road surface having a relatively high water level, this arrangement effectively prevents the outlet from being blocked by the water, soil, sand, and other equivalent substances on the road surface.

The cause of blocking the outlet is not restricted to the water, soil, sand, or other equivalent substances on the road surface. Other potential obstructing objects include, for example, falling objects from the sky, flying objects, and floating objects. In the prior art technique disclosed in Patent Document 2, the outlet is provided on the rectifier structure located on a relatively high position of the vehicle body. Compared with the arrangement of an outlet at the underfloor position in the rear portion of the vehicle body, the arrangement of this cited reference has the higher potential for blockage of the outlet with some foreign object, such as a falling object or a flying object. As in the case of the blockage of the outlet by the water, soil, sand, and other equivalent substances, the blockage of the outlet provided on the rectifier structure may interfere with the smooth discharge of the exhaust gas and the produced water and stop power generation by the fuel cells to eventually prevent further run of the vehicle.

The vehicle 1000 of the first embodiment, on the other hand, has the two outlets 60o and 62o usable to discharge the exhaust gas from the fuel cell stack 10 to the outside of the vehicle 1000. The outlet 62o is located at the higher position than the position of the outlet 60o. Even when the outlet 60o located at the relatively low underfloor position in the rear portion of the vehicle 1000 is blocked by the water, soil, sand, and other equivalent substances during drive of the vehicle 1000 on the water-covered road surface, the arrangement of the first embodiment ensures continuous power generation by the fuel cell stack 10 with discharging the exhaust gas out of the vehicle 1000 via the unblocked outlet 62o located at the relatively high position above the trunk room. Even when the outlet 62o located at the relatively high position above the trunk room is blocked by some foreign object, such as a falling object from the sky or a flying object, during drive of the vehicle 1000 on the non-water-covered but ordinary road surface, the arrangement of the first embodiment ensures continuous power generation by the fuel cell stack 10 with discharging the exhaust gas out of the vehicle 1000 via the unblocked outlet 60o located at the relatively low underfloor position in the rear portion of the vehicle 1000.

B. Second Embodiment

The vehicle 1000 of a second embodiment has the similar structure to that of the vehicle 1000 of the first embodiment, except the structure of a changeover unit in the fuel cell system 100. The structure of a changeover unit 54A of the second embodiment is described below.

B1. Structure of Changeover Unit

Figure 3:
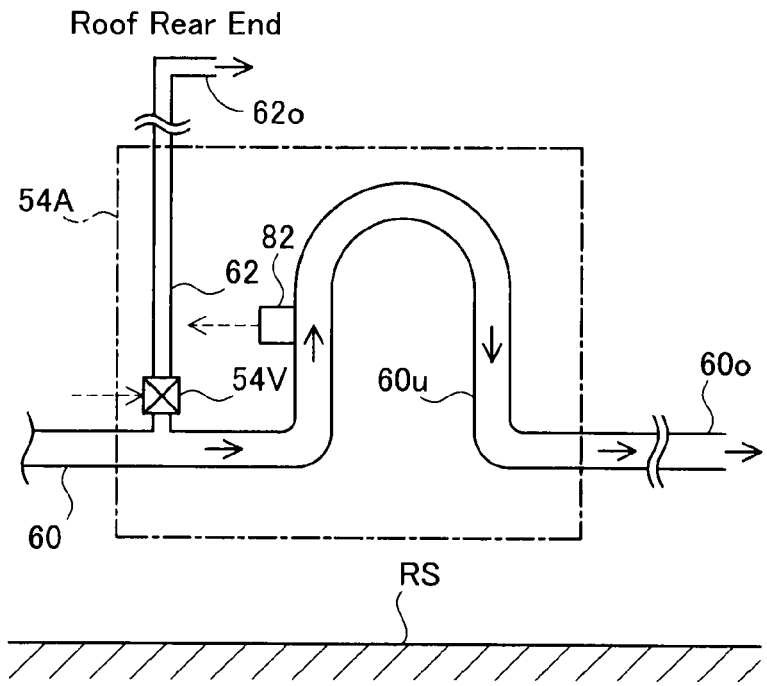
FIG. 3 shows the schematic structure of a changeover unit 54A of a second embodiment.

FIG. 3 shows the schematic structure of the changeover unit 54A of the second embodiment. As illustrated, like the structure of the first embodiment discussed previously, in the changeover unit 54A of the second embodiment, piping 60 includes a U tube 60u convex upward in a vertical direction as part of the piping 60 and has an outlet 60o on its end. The outlet 60o is located at the underfloor position in the rear portion of the vehicle 1000 (see FIG. 2).

Unlike the structure of the first embodiment, in the structure of the second embodiment, piping 62 is connected with and branched off from an upstream part of the piping 60 in upstream of the U tube 60u. The piping 62 is extended along the inner side face of the vehicle body (not shown) to a roof rear end in the vehicle 1000 and has an outlet 62o on its end. Namely the outlet 62o is located at the higher position than the position of the outlet 60o. The piping 62 has an inner diameter sufficiently smaller than the inner diameter of the piping 60.

In the structure of the second embodiment, the piping 62 is provided with an electrically-driven valve 54V, in place of the relief valve 54Vr of the first embodiment. The valve 54V is kept closed in the ordinary driving state, that is, during drive of the vehicle 1000 on the non-water-covered road surface, to discharge the exhaust gas from the fuel cell stack 10 via the outlet 60o to the outside of the vehicle 1000. The U tube 60u is provided with a pressure sensor 82 to measure the internal pressure of the U tube 60u. The control unit 70 controls the open and close operations of the valve 54V according to the output of the pressure sensor 82. The valve 54V and the pressure sensor 82 respectively correspond to the changeover valve and the detector of the invention.

B2. Valve Control Process

Figure 4:
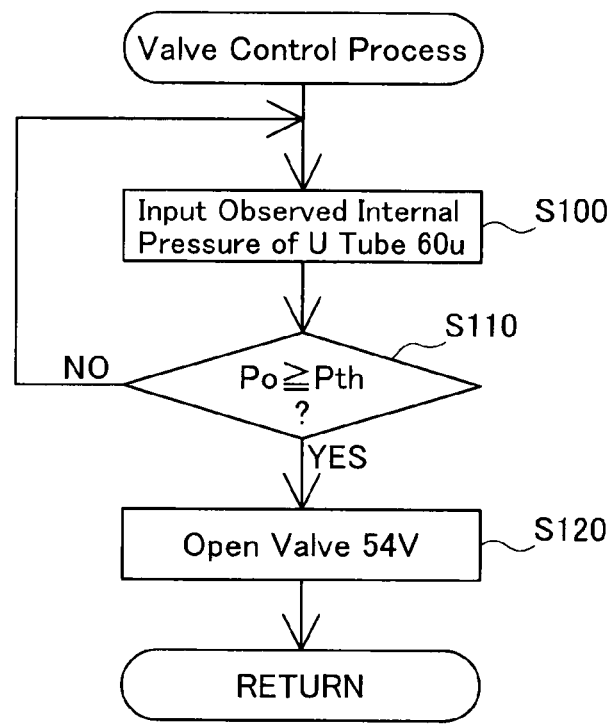
FIG. 4 is a flowchart showing a valve control process of a valve 54V in the second embodiment.

FIG. 4 is a flowchart showing a valve control process of the valve 54V in the second embodiment. The valve control process is executed by the CPU of the control unit 70 during drive of the vehicle 1000.

The CPU inputs an internal pressure Po of the U tube 60u measured by the pressure sensor 82 (step S100) and determines whether the internal pressure Po is not lower than a preset reference pressure Pth (step S110). The reference pressure Pth is set to a criterion value that may suggest blockage of the outlet 60o during power generation by the fuel cell stack 10.

When the internal pressure Po of the U tube 60u is lower than the preset reference pressure Pth (step S110: no), the CPU identifies no blockage of the outlet 60o and returns to the processing of step S100.

When the internal pressure Po of the U tube 60u is not lower than the preset reference pressure Pth (step S110: yes), on the other hand, the CPU identifies blockage of the outlet 60o by some obstructing object and opens the valve 54V (step S120) to make the exhaust gas from the fuel cell stack 10 flow through the piping 62 and discharge the exhaust gas via the outlet 62o to the outside of the vehicle 1000.

The valve control process is then terminated. After this valve control process, the CPU may input again the internal pressure Po of the U tube 60u measured by the pressure sensor 82, identify elimination of the blockage of the outlet 60o in response to a decrease of the internal pressure Po of the U tube 60u below the preset reference pressure Pth, and close the valve 54V.

The vehicle 1000 of the second embodiment has the two outlets 60o and 62o usable to discharge the exhaust gas from the fuel cell stack 10 to the outside of the vehicle 1000. The outlet 62o is located at the higher position than the position of the outlet 60o. Even when the outlet 60o located at the relatively low position is blocked by the water, soil, sand, and other equivalent substances during drive of the vehicle 1000 on the water-covered road surface, the arrangement of the second embodiment ensures continuous power generation by the fuel cell stack 10 with discharging the exhaust gas out of the vehicle 1000 via the unblocked outlet 62o located at the relatively high position.

C. Third Embodiment

In the structures of the first embodiment and the second embodiment, the outlet used to discharge the exhaust gas from the fuel cells to the outside of the vehicle 1000 is changed over automatically or the valve control according to the internal pressure of the U tube 60u. In the structure of a third embodiment, the outlet used to discharge the exhaust gas from the fuel cells to the outside of the vehicle 1000 is changed over according to the level of the water on the road surface RS. A water level sensor is accordingly provided in the gas liquid separator 25 to detect the level of the water on the road surface RS. The vehicle 1000 of the third embodiment has the similar structure to that of the vehicle 1000 of the second embodiment, except the structure of a changeover unit in the fuel cell system 100 and the water level sensor provided in the fuel cell system 100.

C1. Gas Liquid Separator (Water Level Sensor)

Figure 5:
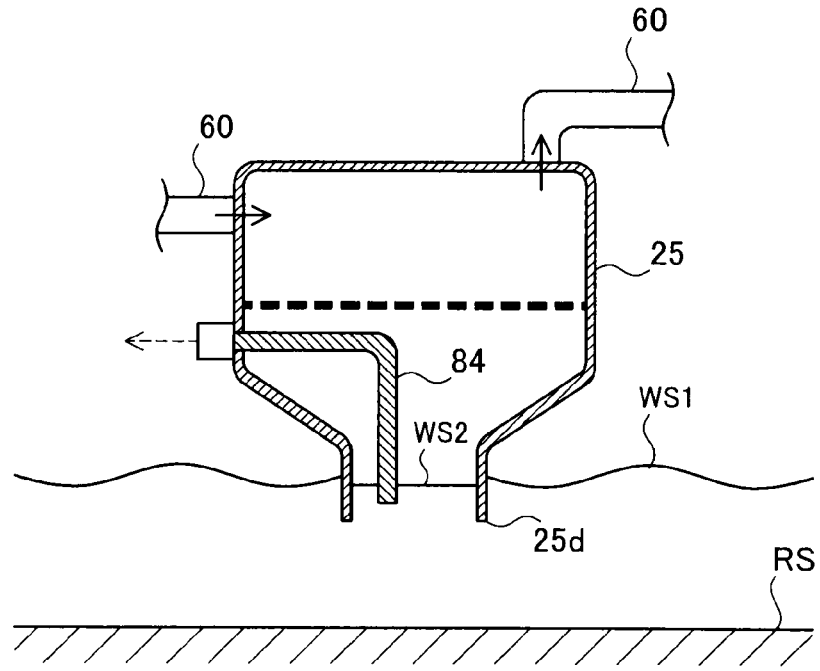
FIG. 5 shows the schematic structure of a gas liquid separator 25.

FIG. 5 shows the schematic structure of the gas liquid separator 25. As discussed previously, the gas liquid separator 25 is used to separate and remove the water content included in the exhaust gas from the diluter 50. The separated water content is discharged from a drain 25d formed on the bottom of the gas liquid separator 25. In this embodiment, a water level sensor 84 is located in the drain 25d as illustrated.

During drive of the vehicle 1000 on the water-covered road with the water on the road surface RS having the water level of higher than the lower end of the drain 25d, while even there is rippling on a water surface WS1 outside the drain 25d of the gas liquid separator 25, a water surface WS2 inside the drain 25d has attenuation of rippling. The water level sensor 84 thus accurately detects the level of the water on the road surface RS. The drain 25d corresponds to the damping member of the invention.

C2. Structure of Changeover Unit

Figure 6:
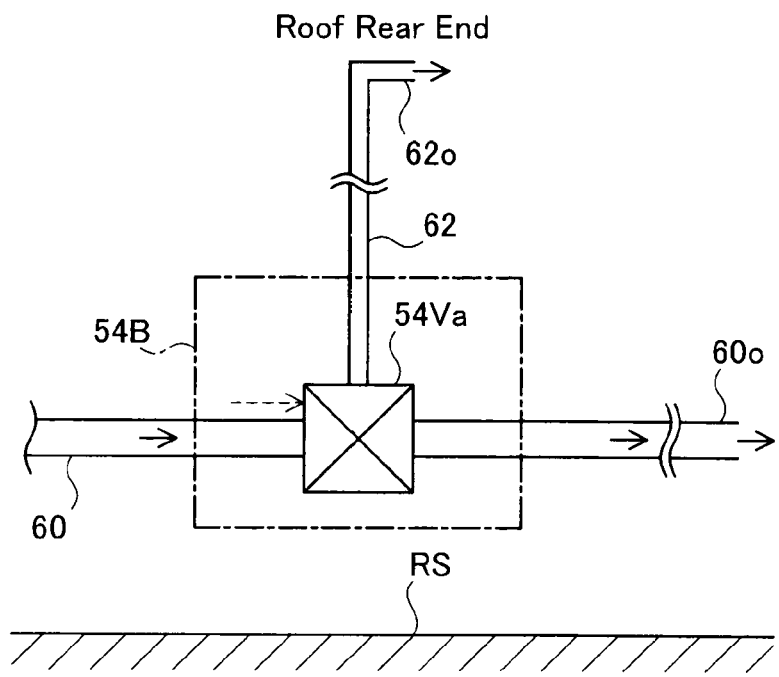
FIG. 6 shows the schematic structure of a changeover unit 54B in a third embodiment.

FIG. 6 shows the schematic structure of a changeover unit 54B in the third embodiment. As illustrated, in the structure of the third embodiment, piping 60 does not have a U tube 60u unlike the structures of the first and the second embodiments, while having an outlet 60o located at the underfloor position in the rear portion of the vehicle 1000 (not shown) like the structures of the first and the second embodiments.

Piping 62 is connected with and branched off from the piping 60 and is extended along the inner side face of the vehicle body (not shown) to a roof rear end in the vehicle 1000 like the structure of the second embodiment. The piping 62 has an outlet 62o on its end. Namely the outlet 62o is located at the higher position than the position of the outlet 60o. The piping 62 has an inner diameter sufficiently smaller than the inner diameter of the piping 60.

In the structure of this embodiment, a three-way valve 54Va is provided at a connection of the piping 60 with the piping 62. Controlling the operation of the three-way valve 54Va changes over the flow of the exhaust gas from the fuel cell stack 10 between a flow route of being discharged via the outlet 60o to the outside of the vehicle 1000 and a flow route of being flowed through the piping 62 and discharged via the outlet 62o to the outside of the vehicle 1000. The three-way valve 54Va corresponds to the changeover valve of the invention. The operation of the three-way valve 54Va is controlled by the control unit 70 according to the output of the water level sensor 84 provided in the gas liquid separator 25.

C3. Valve Control Process

Figure 7:
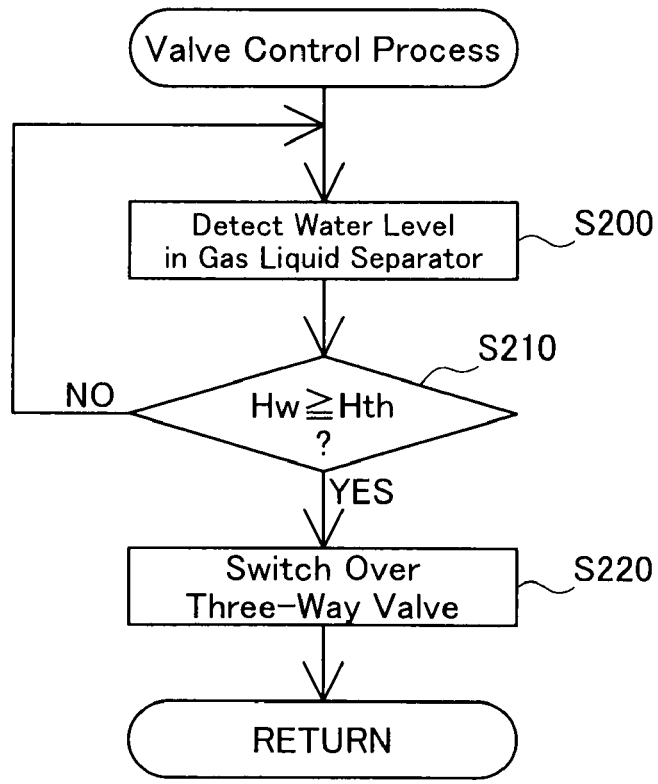
FIG. 7 is a flowchart showing a valve control process of a three-way valve 54Va in the third embodiment.

FIG. 7 is a flowchart showing a valve control process of the three-way valve 54Va in the third embodiment. The valve control process is executed by the CPU of the control unit 70 during drive of the vehicle 1000. At a start of this valve control process, the three-way valve 54Va is set in a connection state that causes the exhaust gas from the fuel cell stack 10 to be discharged via the outlet 60o to the outside of the vehicle 1000.

The CPU inputs a water level Hw in the gas liquid separator 25 detected by the water level sensor 84, that is, the level of the water on the road surface RS (step S200) and determines whether the water level Hw is not lower than a preset reference height Hth (step S210). The reference height Hth is set to a criterion value that may suggest blockage of the outlet 60o during power generation by the fuel cell stack 10.

When the water level Hw in the gas liquid separator 25 is lower than the preset reference height Hth (step S210: no), the CPU identifies no blockage of the outlet 60o and returns to the processing of step S200.

When the water level Hw in the gas liquid separator 25 is not lower than the preset reference height Hth (step S210: yes), on the other hand, the CPU identifies blockage of the outlet 60o by some obstructing object and switches over the connection state of the three-way valve 54Va (step S220) to make the exhaust gas from the fuel cell stack 10 flow through the piping 62 and discharge the exhaust gas via the outlet 62o to the outside of the vehicle 1000.

The valve control process is then terminated. After this valve control process, the CPU may input again the water level Hw in the gas liquid separator 25 detected by the water level sensor 84 and identify elimination of the blockage of the outlet 60o in response to a decrease of the water level Hw in the gas liquid separator 25 below the reference height Hth. The CPU then switches over the connection state of the three-way valve 54Va to discharge the exhaust gas from the fuel cell stack 10 via the outlet 60o.

The vehicle 1000 of the third embodiment has the two outlets 60o and 62o usable to discharge the exhaust gas from the fuel cell stack 10 to the outside of the vehicle 1000. The outlet 62o is located at the higher position than the position of the outlet 60o. Even when the outlet 60o located at the relatively low position is blocked by the water, soil, sand, and other equivalent substances during drive of the vehicle 1000 on the water-covered road surface, the arrangement of the third embodiment ensures continuous power generation by the fuel cell stack 10 with discharging the exhaust gas out of the vehicle 1000 via the unblocked outlet 62o located at the relatively high position.

D. Other Aspects

The embodiments discussed above are to be considered in all aspects as illustrative and not restrictive. There may be many modifications, changes, and alterations without departing from the scope or spirit of the main characteristics of the present invention. Some examples of possible modification are given below.

D1. Modified Example 1

In the structure of the first embodiment, the piping 62 is provided with the relief valve 54Vr. The relief valve 54Vr is, however, neither essential nor restrictive. In one modified structure, the piping 62 may be provided with an orifice, in place of the relief valve 54Vr. The orifice provided on the piping 62, however, works to continuously discharge the exhaust gas from the fuel cell stack 10 via the outlet 62o to the outside of the vehicle 1000.

In the structure of the first embodiment, the piping 62 is connected with and branched off from the top of the U tube 60u. The piping 62 may alternatively be connected with and branched off from the upstream part of the piping 60 in upstream of the U tube 60u like the structure of the second embodiment.

D2. Modified Example 2

In the structure of the second embodiment, the valve 54V is opened in response to an increase of the internal pressure of the U tube 60u measured by the pressure sensor 82 to or above the preset reference pressure. This arrangement is, however, neither essential nor restrictive. In one modified structure, a water level sensor may be provided at any suitable position in the vehicle 1000 to detect the level of the water on the road surface RS, like the structure of the third embodiment. The valve 54V may be opened in response to an increase of the water level detected by the water level sensor to or above a preset reference height.

D3. Modified Example 3

In the structure of the third embodiment, the water level sensor 84 is provided in the gas liquid separator 25. This arrangement is, however, neither essential nor restrictive.

Figure 8:
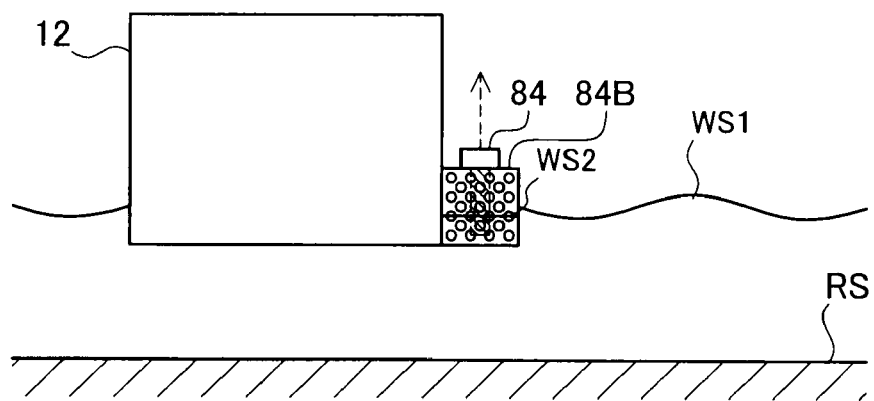
FIG. 8 shows another arrangement of a water level sensor 84 in one modified example.

FIG. 8 shows another arrangement of the water level sensor 84 in one modified structure. In this modified example, a sensor box 84B having multiple through holes formed on the periphery thereof is provided at the lower most position on the side face of the stack casing 12 for keeping the fuel cell stack 10 therein. The water level sensor 84 is located inside the sensor box 84B.

During drive of the vehicle 1000 on the water-covered road with the water on the road surface RS having the water level of higher than the lower most position of the stack casing 12, while even there is rippling on a water surface WS1 outside the sensor box 84B, a water surface WS2 inside the sensor box 84B has attenuation of rippling. The water level sensor 84 thus accurately detects the level of the water on the road surface RS. The sensor box 84B corresponds to the damping member of the invention.

The sensor box 84B provided in this modified structure is, however, not essential. The structure of the third embodiment and the modified structure of the third embodiment use the contact-type water level sensor that is in contact with the water and detects the water level. The water level sensor may be a non-contact-type water level sensor that is not in contact with the water and detects the distance from the water surface, for example, a ultrasonic sensor. The water level sensor 84 may be provided at a different site in the vehicle 1000.

D4. Modified Example 4

In the structures of the first through the third embodiments, the piping 62 is connected with the piping 60. This arrangement is, however, neither essential nor restrictive. The general requirements of the invention are that exhaust piping is arranged to flow out an exhaust fluid (for example, the exhaust gas or the produced water) from the fuel cells (fuel cell stack 10) to the outside of the moving body (for example, the vehicle 1000) and has multiple outlets and that at least two outlets among the multiple outlets are located at positions of different heights on the main body of the moving body.

Figure 9:
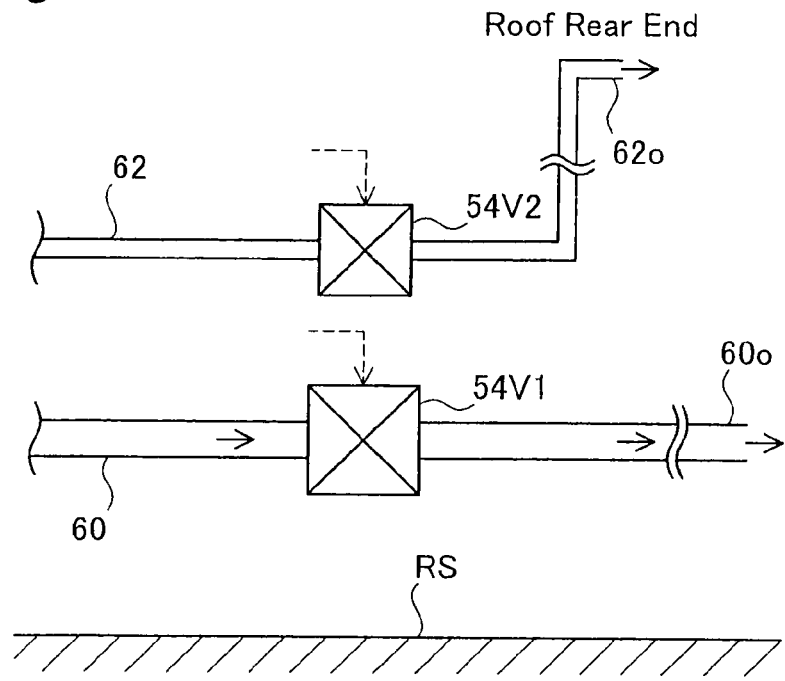
FIG. 9 shows another arrangement of piping 60 and piping 62 in one modified example.

FIG. 9 shows another arrangement of the piping 60 and the piping 62 in one modified structure. As illustrated, in the modified structure, the piping 60 and the piping 62 are not interconnected but are independently provided in the vehicle 1000. The piping 60 and the piping 62 are respectively provided with a valve 54V1 and with a valve 54V2. These valves 54V1 and 54V2 are equivalent to the changeover unit of the invention. The operations of the valves 54V1 and 54V2 are controlled by the control unit 70 according to the output of the water level sensor 84 discussed in the third embodiment.

In this modified structure, the opening 60o is located at the underfloor position in the rear portion of the vehicle 1000, while the opening 62o is located at the roof rear end of the vehicle 1000.

Figure 10:
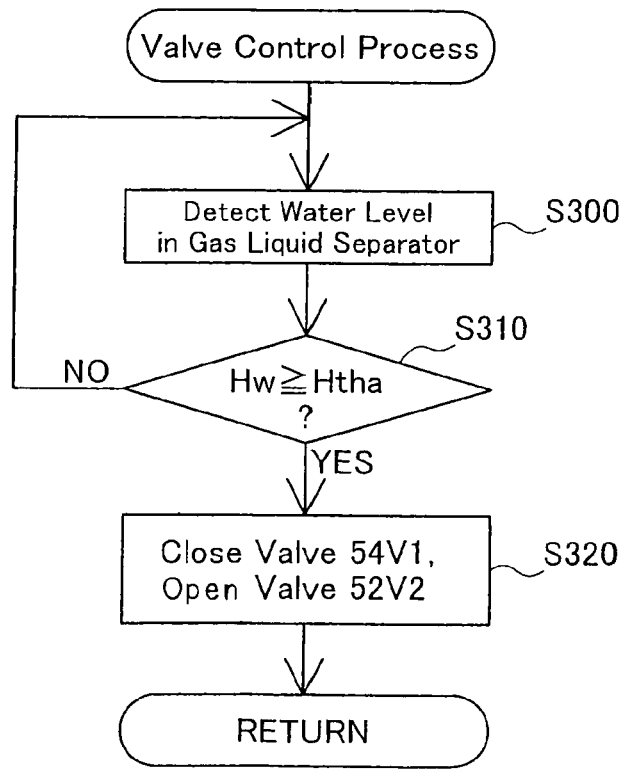
FIG. 10 is a flowchart showing a valve control process in the modified structure.

FIG. 10 is a flowchart showing a valve control process in this modified structure. The valve control process is executed by the CPU of the control unit 70 during drive of the vehicle 1000. At a start of the valve control process, the valve 54V1 is opened and the valve 54V2 is closed in this modified structure. In the ordinary driving state, the exhaust gas from the fuel cell stack 10 is discharged via the outlet 60o to the outside of the vehicle 1000.

The CPU inputs a water level Hw in the gas liquid separator 25 detected by the water level sensor 84, that is, the level of the water on the road surface RS (step S300) and determines whether the water level Hw is not lower than a preset reference height Htha (step S310). The reference height Htha is set to a criterion value that may suggest the potential for inflow of water, soil, sand, and other equivalent substances into the outlet 60o during power generation by the fuel cell stack 10. The reference height Htha is thus set to be lower than the reference height Hth of the third embodiment.

When the water level Hw in the gas liquid separator 25 is lower than the preset reference height Htha (step S310: no), the CPU identifies substantially no potential for inflow of water, soil, sand, and other equivalent substances into the outlet 60o and returns to the processing of step S300.

When the water level Hw in the gas liquid separator 25 is not lower than the preset reference height Htha (step S310: yes), on the other hand, the CPU identifies the potential for inflow of water, soil, sand, and other equivalent substances into the outlet 60o. The CPU accordingly closes the valve 54V1 provided on the piping 60 and opens the valve 54V2 provided on the piping 62 (step S320) to make the exhaust gas from the fuel cell stack 10 flow through the piping 62 and discharge the exhaust gas via the outlet 62o to the outside of the vehicle 1000.

The valve control process is then terminated. After this valve control process, the CPU may input again the water level Hw in the gas liquid separator 25 detected by the water level sensor 84 and identify substantially no potential for inflow of water, soil, sand, and other equivalent substances into the outlet 60o in response to a decrease of the water level Hw in the gas liquid separator 25 below the reference height Htha. The CPU then switches over the open-close positions of the valves 54V1 and 54V2 to discharge the exhaust gas from the fuel cell stack 10 via the outlet 60o.

The vehicle 1000 of the modified example has the two outlets 60o and 62o usable to discharge the exhaust gas from the fuel cell stack 10 to the outside of the vehicle 1000. The outlet 62o is located at the higher position than the position of the outlet 60o. When there is a potential for inflow of water, soil, sand, and other equivalent substances into the outlet 60o located at the relatively low position during drive of the vehicle 1000 on the water-covered road surface, the arrangement of the modified example closes the valve 54V1 to prevent the inflow of water, soil, sand, and other equivalent substances into the outlet 60o and ensures continuous power generation by the fuel cell stack 10 with discharging the exhaust gas out of the vehicle 1000 via the outlet 62o of the non-inflow potential located at the relatively high position.

The valve control process of the modified example keeps the valve 54V2 closed in the ordinary driving state. The valve 54V2 may alternatively be kept open in the ordinary driving state.

In the structure of this modified example, the valve 54V1 is provided on the piping 60. The piping 60 may have the U tube 60u discussed in the first embodiment as part of the piping 60, in place of the valve 54V1. Even in the event of inflow of the water, soil, sand, and other equivalent substances into the outlet 60o during drive of the vehicle 1000 on the water-covered road, this arrangement effectively prevents the further inflow of the water, soil, sand, and other equivalent substances to the upstream of the U tube 60u until the level of the water on the road surface RS exceeds the height from the road surface RS to the top of the U tube 60u.

The valve 54V2 provided on the piping 62 in the structure of this modified example may be omitted.

D5. Modified Example 5

In the embodiments and the modified examples discussed above, the inner diameter of the piping 62 is set smaller than the inner diameter of the piping 60. The invention is, however, not restricted to such setting. For example, the inner diameter of the piping 60 may be set equal to the inner diameter of the piping 62.

D6. Modified Example 6

In the second and the third embodiments and their modified example, the outlet 62o is placed at the roof rear end of the vehicle 1000. This position is, however, neither essential nor restrictive. Any other suitable layout is adoptable as long as the outlet 62o is located at the higher position than the position of the outlet 60o. For example, the outlet 62o may be located in a rear spoiler of the vehicle 1000, above the trunk room behind the fuel cell system 100, or in a side portion of the vehicle 1000.

D7. Modified Example 7

The embodiments and the modified examples discussed above have the two pipings, the piping 60 and the piping 62, as the exhaust conduits to discharge the exhaust gas from the fuel cell stack 10 to the outside of the vehicle 1000. This structure is, however, neither essential nor restrictive. The vehicle may have three or more pipings as the exhaust conduits. Even when any one of multiple outlets is blocked by any of various obstructing objects including falling objects from the sky, flying objects, floating objects, as well as the water, soil, sand on the water-covered road surface, this modified arrangement ensures continuous drive of the vehicle with discharging the exhaust fluid from the fuel cells via another outlet.

D8. Modified Example 8

In the embodiments discussed above, the fuel cell stack 10 is installed in the underfloor area of the vehicle 1000. The invention is, however, not restricted to this layout. The fuel cell stack 10 may be installed in any suitable area, for example, in a front space of the vehicle 1000.

D9. Modified Example 9

The above embodiments describe the application of the invention to the vehicle 1000. The invention is, however, not restricted to this application. The technique of the invention is applicable to various moving bodies equipped with fuel cells and designed to move with electric power generated by the fuel cells as driving power source.

D10. Modified Example 10

In the modified example discussed above, the exhaust piping is arranged to flow out an exhaust fluid (for example, the exhaust gas or the produced water) from the fuel cells (fuel cell stack 10) to the outside of the moving body (for example, the vehicle 1000) and has multiple outlets. The expression of 'two outlets among the multiple outlets are located at positions of different heights on the main body of the moving body' is not restricted to the structure having the upper end of one outlet (for example, the outlet 60o of the piping 60) located at the lower position than the lower end of the other outlet (for example, the outlet 62o of the piping 62) in the direction of gravity as in the embodiments. The invention is applicable to any structure having at least a lower end of one outlet located at the lower position than a lower end of the other outlet in the direction of gravity. Namely the requirement is a positional difference in the direction of gravity between the lower end of one outlet and the lower end of the other outlet. For example, the invention is applicable to one modified structure where the lower end of one outlet (for example, the outlet 60o of the piping 60) is located at the lower position than the lower end of the other outlet (for example, the outlet 62o of the piping 62), while the upper end of one outlet (for example, the outlet 60o of the piping 60) is located at the higher position than the lower end of the other outlet (for example, the outlet 62o of the piping 62).

The invention claimed is:

1. A moving body equipped with fuel cells arranged in a fuel cell stack, the moving body comprising:
    exhaust piping arranged to flow an exhaust fluid discharged from the fuel cells outside of the moving body, wherein
    the exhaust piping extends from a cathode off-gas discharge section that exits the fuel cell stack and from an anode off-gas discharge section that exits the fuel cell stack,
    the exhaust piping includes first piping with a first outlet provided on an end thereof and second piping with a second outlet provided on an end thereof,
    the second outlet is located at a higher position than a position of the first outlet in a vertical direction of the moving body, the first piping includes a higher place element formed to cause the exhaust fluid flowing through the first piping to be flowed at a higher position than the position of the first outlet, as part of the first piping, and the second piping is connected with and branched off from the higher place element of the first piping or from an upstream part of the first piping in upstream of the higher place element in a flow direction of the exhaust fluid.

2. The moving body in accordance with claim 1, wherein the second piping has an inner diameter that is smaller than an inner diameter of the first piping.

3. The moving body in accordance with claim 1, wherein the fuel cells are located in an underfloor area of the moving body.

4. The moving body in accordance with claim 1, wherein
the first piping includes a U-shaped element which includes the higher place element.

5. The moving body in accordance with claim 1, further comprising:
a diluter that mixes anode off gas and cathode off gas of the fuel cells,
wherein the exhaust fluid is discharged from diluter to the first piping.

6. A moving body equipped with fuel cells, the moving body comprising:
exhaust piping arranged to flow out an exhaust fluid discharged from the fuel cells, wherein
the exhaust piping includes first piping with a first outlet provided on an end thereof and second piping with a second outlet provided on an end thereof,
the second outlet is located at a higher position than a position of the first outlet in a vertical direction,
the first piping includes a higher place element formed to cause the exhaust fluid flowing through the first piping to be flowed at a higher position than the position of the first outlet, as part of the first piping,
the second piping is connected with and branched off from the higher place element of the first piping or from an upstream part of the first piping in upstream of the higher place element in a flow direction of the exhaust fluid, and
the moving body further includes a changeover unit provided at a connection of the first piping with the second piping to change over flow of the exhaust fluid between a flow route of being discharged via the first outlet and a flow route of being flowed through the second piping and discharged via the second outlet.

7. The moving body in accordance with claim 6, wherein the changeover unit includes a pressure control mechanism configured to make the exhaust fluid flow through the second piping when an internal pressure of the first piping increases to or above a preset reference value.

8. The moving body in accordance with claim 6, the moving body further comprising:
a detector configured to detect a presence status of an obstructing object, which has a potential for blocking the first outlet, in the surroundings of the moving body;
a changeover valve provided as the changeover unit to change over the flow of the exhaust fluid between the flow route of being discharged via the first outlet and the flow route of being flowed through the second piping and discharged via the second outlet; and
a valve controller configured to control operation of the changeover valve according to the presence status of the obstructing object detected by the detector.

9. The moving body in accordance with claim 8, wherein the obstructing object is water present on road surface, and the detector includes a water level sensor configured to detect a level of the water present on the road surface.

10. The moving body in accordance with claim 9, the moving body further comprising:
a damping member configured to attenuate a rippling phenomenon on a water surface as a detection object of the water level by the water level sensor.

11. The moving body in accordance with claim 9, wherein the valve controller controls operation of the changeover valve to make the exhaust fluid flow through the second piping when the water level detected by the water level sensor is not lower than a preset reference height.

12. The moving body in accordance with claim 6, wherein
the first piping includes a U-shaped element which includes the higher place element.

13. The moving body in accordance with claim 7, wherein the pressure control mechanism is a normally-closed relief valve.

* * * * *